(12) United States Patent
Ye et al.

(10) Patent No.: US 10,277,655 B2
(45) Date of Patent: Apr. 30, 2019

(54) SCHEDULING METHOD AND DEVICE FOR PROTOCOL STACK IN REMOTE PRESENTATION SYSTEM

(71) Applicant: ZTE CORPORATION, Shenzhen (CN)

(72) Inventors: Xiaoyang Ye, Shenzhen (CN); Liang Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 147 days.

(21) Appl. No.: 15/318,147

(22) PCT Filed: Sep. 30, 2014

(86) PCT No.: PCT/CN2014/088049
§ 371 (c)(1),
(2) Date: Dec. 12, 2016

(87) PCT Pub. No.: WO2015/188534
PCT Pub. Date: Dec. 17, 2015

(65) Prior Publication Data
US 2017/0134472 A1    May 11, 2017

(30) Foreign Application Priority Data
Jun. 11, 2014   (CN) .......................... 2014 1 0259104

(51) Int. Cl.
*G06F 15/16* (2006.01)
*H04L 29/06* (2006.01)
*H04L 12/18* (2006.01)

(52) U.S. Cl.
CPC ............ *H04L 65/608* (2013.01); *H04L 12/18* (2013.01); *H04L 12/1881* (2013.01);
(Continued)

(58) Field of Classification Search
CPC ... H04L 65/608; H04L 12/18; H04L 12/1881; H04L 65/1009; H04L 69/18; H04L 65/4007; H04L 65/403; H04L 69/24
See application file for complete search history.

(56) References Cited

U.S. PATENT DOCUMENTS

2009/0201802 A1*  8/2009  Ye .................... H04L 29/12924
                                                370/221
2015/0181164 A1   6/2015  Yang et al.

FOREIGN PATENT DOCUMENTS

| CN | 102843542 A | 12/2012 |
|---|---|---|
| CN | 102883131 A | 1/2013 |
| JP | 2008034900 A | 2/2008 |

OTHER PUBLICATIONS

Extended European Search Report, dated May 17, 2017, Application No. EP 14894678.3, 9 Pages.
(Continued)

*Primary Examiner* — Ryan J Jakovac
(74) *Attorney, Agent, or Firm* — Plumsea Law Group, LLC (57) ABSTRACT

Disclosed are a method and device for scheduling a protocol stack in a telepresence system. The scheduling method includes: a telepresence endpoint acquiring a first state of an H.323 protocol stack and a second state of a third-party protocol stack, herein, the third-party protocol stack is used for performing interaction and negotiation on new characteristic parameters of the telepresence system, and the new characteristic parameters are different from contents for performing capability negotiation through the H.323 protocol stack in the telepresence system; the telepresence endpoint scheduling the H.323 protocol stack and/or the third-party protocol stack to execute a corresponding internal processing action according to a preset scheduling rule based on the first state and/or second state.

7 Claims, 4 Drawing Sheets

A remote presentation endpoint acquires a first state of an H.323 protocol stack and a second state of a third-party protocol stack, herein, the third-party protocol stack is used for performing interaction and negotiation on new characteristic parameters of the remote presentation system, and the new characteristic parameters are different from contents for performing capability negotiation through the H.323 protocol stack in the remote presentation system — S102

The remote presentation endpoint schedules the H.323 protocol stack and/or the third-party protocol stack to execute internal processing actions in accordance with a preset scheduling rule according to the first state and/or the second state — S104

(52) U.S. Cl.
CPC .......... *H04L 65/1009* (2013.01); *H04L 69/18* (2013.01); *H04L 65/403* (2013.01); *H04L 65/4007* (2013.01); *H04L 69/24* (2013.01)

(56) References Cited

OTHER PUBLICATIONS

Botzko, Stephen, H.TPS-SIG Signalling for Telepresence-enabled Conferencing, Dated Jun. 5, 2014, 15 Pages.
Wang, Liang, Proposed Initial Input Draft: Signaling for Telepresence Systems, Dated Oct. 15, 2013, 19 Pages.
PCT International Search Report dated Feb. 26, 2015, Application No. PCT/CN2014/088049, 3 Pages.

* cited by examiner

SCHEDULING METHOD AND DEVICE FOR PROTOCOL STACK IN REMOTE PRESENTATION SYSTEM

CROSS-REFERENCE TO RELATED APPLICATIONS

This application is the U.S. national phase of PCT Application No. PCT/CN2014/088049 filed on Sep. 30, 2014, which claims priority to Chinese Patent Application No. 201410259104.4 filed on Jun. 11, 2014, the disclosures of which are incorporated in their entirety by reference herein.

TECHNICAL FIELD

The present document relates to the field of the remote presentation and video conference, and particularly, to a method and device for scheduling a protocol stack in a remote presentation system.

BACKGROUND

In a remote presentation system developed based on a video conference system of the H.323 protocol put forward by the ITU-T, a new interaction flow is introduced to complete the interaction and negotiation of new characteristic parameters of remote presentation (such as a media collecting attribute, an encoding group attribute, a scenario collecting attribute and a simultaneous capability set attribute) and multi-code stream characteristic information (a code stream multiplexing mode and multiplexing information). Therefore, how to keep a relative independence from the existing H.323 protocol stack at a protocol signaling aspect, and enable the implementation of the new characteristics to have a good expandability, and be easier to implement an intercommunication with the remote presentation system based on a Session Initiation Protocol (SIP) proposed by the Internet Engineering Task Force (IETF) is an important problem required to be considered.

From a technical perspective, it can modify the existing H.323 protocol stack, expand parts of interaction flows and protocol parameters to complete the interaction and negotiation of new characteristic parameters of the remote presentation. For example, part of product implementations are a remote presentation system integrated from multiple H.323 video conference terminals, each terminal respectively performs calling and capability set interaction; or the interaction of parts of remote presentation ability parameters is implemented by extending an H.245 capability set. Since the characteristic parameters of the remote presentation and multi-code stream attributes are more complicated, a great modification to the original H.323 protocol will be caused only by means of expanding the H.323 protocol, it is extremely difficult to describe complicated parameters due to the limitation of the limitation of the H.323 protocol message structure,. In the scheme of modifying the existing H.323 protocol stack, it needs the manufacturers to change the protocol stack, which is very difficult from a business perspective. On the other hand, in order to be convenient for intercommunicating with the remote presentation system based on the SIP defined by the standards organization Internet Engineering Task Force (IETF), separately processing the newly added remote presentation new functions and the existing basic call session and capability negotiation is a better solution.

At present, there is also one implementation way which is based on H.323 protocol stack. and introduces an enterprise standard Telepresence Interoperability Protocol (TIP) put forward by Cisco The TIP defines a plurality of message fields to transmit the remote presentation characteristic parameters and identify the multi-path code stream information by using rules of a Real-time Transport Protocol (RTP) Control Protocol (RTCP), since there have been an RTCP channel and message transmission after a media channel is established in the original H.323 or SIP system, the introduction of the TIP protocol is only required to encapsulate and parse the newly defined parameters with the RTCP message, which relates to the interaction between the original H.323 protocol stack and the TIP protocol; but, the TIP protocol itself is an extension to the RTCP message, only can transmit a very simple kind of information such as a relation between the agent position and the code stream, and the more complicated remote presentation ability parameters are not considered, which has a very great limitation, and cannot solve the problem of interaction of more complicated new characteristics in the remote presentation system.

At present the ControLling mUltiple streams for tElepresence (CLUE) working group of the IETF are discussing new characteristic parameters of the remote presentation and multi-code stream attributes, and the traditional video conference product manufacturers need to consider how to introduce the contents of the CLUE protocol in the H.323 system.

SUMMARY

With respect to the technical problems that there has been no solution of introducing a third-party protocol stack in an H.323 system to implement the interaction and negotiation of new characteristic parameters yet, the present document provides a method and device for scheduling a protocol stack in a remote presentation system to at least solve the above technical problems.

In order to achieve the above purpose, an embodiment of the present document provides a method for scheduling a protocol stack in a remote presentation system, including: a remote presentation endpoint acquiring a first state of an H.323 protocol stack and a second state of a third-party protocol stack, herein, the third-party protocol stack is used for performing interaction and negotiation on new characteristic parameters of the remote presentation system, and the new characteristic parameters are different from contents for performing capability negotiation through the H.323 protocol stack in the remote presentation system; and the remote presentation endpoint scheduling the H.323 protocol stack and/or the third-party protocol stack to execute a corresponding processing action according to a preset scheduling rule based on the first state and/or the second state.

Alternatively, the remote presentation endpoint scheduling the H.323 protocol stack and/or the third-party protocol stack to execute corresponding internal processing actions according to a preset scheduling rule based on the first state and/or the second state includes: when the first state and/or the second state is changed, the remote presentation endpoint updating the first state and/or the second state, and scheduling the H.323 protocol stack and/or the third-party protocol stack to execute a next action according to an updated first state and an updated second state.

Alternatively, scheduling the H.323 protocol stack and/or the third-party protocol stack to execute a next action according to a preset scheduling rule includes: redetermining a scheduling strategy in the preset scheduling rule according to the updated first state and/or the updated second state, a previous scheduling processing result and a logical relationship between the first state and the second state; and scheduling the H.323 protocol stack and/or the third-party protocol stack to execute the next action according to a redetermined scheduling strategy.

Alternatively, the remote presentation endpoint scheduling the H.323 protocol stack and/or the third-party protocol stack to execute a corresponding processing action in according to a preset scheduling rule based on the first state and/or the second state includes at least one of the following: performing initialization processing on the H.323 protocol stack and/or the third-party protocol stack, scheduling a protocol processing interface of the H.323 protocol stack and/or the third-party protocol stack, and releasing the H.323 protocol stack and/or the third-party protocol stack.

Alternatively, the remote presentation endpoint scheduling the H.323 protocol stack and/or the third-party protocol stack to execute a corresponding processing action according to a preset scheduling rule according to the first state and/or the second state includes: when the first state indicates that a current call is remote presentation communication and supports a third-party protocol corresponding to the third-party protocol stack, the remote presentation endpoint starting the third-party protocol stack.

Alternatively, after the remote presentation endpoint starting the third-party protocol stack, the method further includes: the remote presentation endpoint updating the first state and the second state; and the remote presentation endpoint scheduling the H.323 protocol stack to perform capability negotiation and determining a communication channel required to be used for executing the interaction and negotiation of the new characteristic parameters according to an updated first state and an updated second state u.

Alternatively, after determining the communication channel required to be used for executing the interaction and negotiation of the new characteristic parameters, the method further includes: the remote presentation endpoint scheduling a processing interface of the third-party protocol stack to perform interaction and negotiation of the new characteristic parameters; the remote presentation endpoint scheduling the H.323 protocol stack to open a media logical channel interface and establishing a media transmission channel according to a capability negotiation result of the H.323 protocol stack and a negotiation result of the new characteristic parameters; and the remote presentation endpoint scheduling a media transmitting and receiving processing interface of the H.323 protocol stack to transfer media streams via the media transmission channel.

Alternatively, after the remote presentation endpoint scheduling a media transmitting and receiving processing interface of the H.323 protocol stack to transfer media streams, the method further includes: when the first state indicates that the call is hanged up, the remote presentation endpoint scheduling the third-party protocol stack to release protocol stack resources.

In order to achieve the above purpose, another embodiment of the present document provides a device for scheduling a protocol stack in a remote presentation system including: an acquisition module, arranged to acquire a first state of an H.323 protocol stack and a second state of a third-party protocol stack, herein, the third-party protocol stack is used for performing interaction and negotiation on new characteristic parameters of the remote presentation system, and the new characteristic parameters are different from contents for performing capability negotiation through the H.323 protocol stack in the remote presentation system; and a scheduling module, arranged to schedule the H.323 protocol stack and/or the third-party protocol stack to execute a corresponding processing action according to a preset scheduling rule based on the first state and/or the second state.

Alternatively, the device further includes: an updating module, arranged to: when the first state and/or the second state is changed, update the first state and/or the second state; the scheduling module is arranged to schedule the H.323 protocol stack and/or the third-party protocol stack to execute a next action according to an updated first state and an updated second state.

Alternatively, the scheduling module is further arranged to: redetermine a scheduling strategy in the preset scheduling rule according to the updated first state and the updated second state, a previous scheduling processing result and a logical relationship between the first state and the second state; and schedule the H.323 protocol stack and/or the third-party protocol stack to execute the next action according to a redetermined scheduling strategy.

Through the present document, with the technical means of the remote presentation endpoint performing scheduling on the two types of protocol stacks according to the state of the H.323 protocol stack and the state of the third-party protocol stack acquired, the technical problems that there has been no solution of introducing the third-party protocol stack (such as a CLUE protocol stack) in the H.323 system to implement the interaction and negotiation of the new characteristic parameters yet are solved, thereby implementing coordinated scheduling of multiple protocol stacks in the remote presentation system.

BRIEF DESCRIPTION OF DRAWINGS

Here, the described accompanying drawings are used to provide a further understanding of the present document and constitute a part of the present document. The schematic embodiments and illustrations thereof of the present document are used to explain the present document, but do not constitute an inappropriate limitation on the present document. In the drawings.

SPECIFIC EMBODIMENTS

The present document will be described in detail in combination with the accompanying drawings and embodiments below. It should be noted that the embodiments in the present document and the features in the embodiments can be combined with each other in the case of no conflict.

With respect to problems that there is no corresponding solution when the third-party protocol stack is introduced due to technical problems that the interaction and negotiation of the limited new characteristic parameters has a certain limitation and complicated implementation, the following embodiments provide corresponding solutions, which will be described in detail below.

The new characteristic parameters of the remote presentation system include but are not limited to: media collecting source description information of the remote presentation endpoint, scenario collecting information, simultaneous collecting capability set information, information of a remote presentation participant and multi-code stream multiplexing description information and so on.

Figure 1:
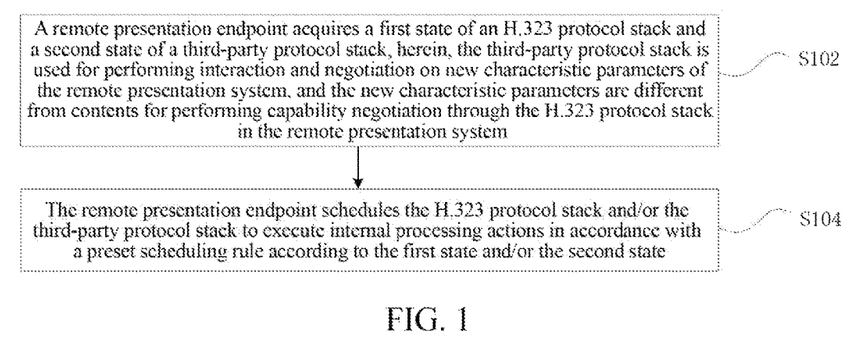
FIG. 1 is a flow chart of a method for scheduling a protocol stack in a remote presentation system according to the embodiment of the present document.

FIG. 1 is a flow chart of a method for scheduling a protocol stack in a remote presentation system according to the embodiment of the present document. As shown in FIG. 1, the method includes steps S102-S104:

In step S102, a remote presentation endpoint acquires a first state of an H.323 protocol stack and a second state of a third-party protocol stack, herein, the third-party protocol stack is used for performing interaction and negotiation on new characteristic parameters of the remote presentation system, and the new characteristic parameters are different from contents for performing capability negotiation through the H.323 protocol stack in the remote presentation system;

In step S104, the remote presentation endpoint schedules the H.323 protocol stack and/or the third-party protocol stack to execute internal processing actions according to a preset scheduling rule based on the first state and/or the second state.

Through each processing step above, since the two types of protocol stacks can be scheduled according to the preset scheduling rule based on the acquired state of the H.323 protocol stack and the acquired state of the third-party protocol stack, the technical problems that there has been no solution of introducing the third-party protocol stack in an H.323 system to implement the interaction and negotiation of the new characteristic parameters yet can be solved, which implements coordinated scheduling of the H.323 protocol and the third-party protocol.

Each processing step above can be implemented by a protocol control module in the remote presentation endpoint, and the protocol control module can be a newly added software or hardware module.

The step S104 can be implemented in the following way, but it is not limited to this: when the first state and/or the second state is changed, the above endpoint updating the first state and/or the second state, and scheduling the H.323 protocol stack and/or the third-party protocol stack to execute a next action according to the updated first state and the updated second state. Herein, scheduling the H.323 protocol stack and/or the third-party protocol stack to execute a next action according to the updated first state and the updated second state can be manifested as: redetermining a scheduling strategy in the preset scheduling rule according to the updated first state and/or the updated second state, a previous scheduling processing result and a logical relationship between the first state and the second state; and scheduling the H.323 protocol stack and/or the third-party protocol stack to execute the next action according to the redetermined scheduling strategy. Herein, the above logical relationship between the first state and the second state is used for implementing a service flow of the remote presentation communication, and the service flow can be manifested as a flow defined by the H.323 protocol stack and third-party protocol stack and a mutual restrictive relation between the two states. For example, only when the negotiation processing of the CLUE protocol stack is ended, the H.323 protocol stack can be scheduled to open a logical media channel for processing related in the following embodiments, for details, please refer to the preferred embodiments, which will not be repeated here.

In the embodiment, the scheduling performed by the remote presentation endpoint on the H.323 protocol stack and/or the third-party protocol stack can include at least one of the following: performing initialization processing on the H.323 protocol stack and/or the third-party protocol stack, scheduling a protocol processing interface of the H.323 protocol stack and/or the third-party protocol stack, and releasing the H.323 protocol stack and/or the third-party protocol stack.

Specifically, in one preferred implementation process of the step S104, when the above first state indicates that the current call is remote presentation communication and supports a third-party protocol corresponding to the third-party protocol stack, the above remote presentation endpoint starts the third-party protocol stack.

The remote presentation endpoint updates the first state and the second state; and the remote presentation endpoint schedules the H.323 protocol stack to perform capability negotiation according to the updated first state and the updated second state and determines a communication channel required to be used for executing the interaction and negotiation of the above new characteristic parameters. After determining the communication channel required to be used for executing the interaction and negotiation of the above new characteristic parameters, the remote presentation endpoint schedules a processing interface of the third-party protocol stack to perform interaction and negotiation of the new characteristic parameters; then according to a capability negotiation result of the H.323 protocol stack and a negotiation result of the new characteristic parameters, the remote presentation endpoint schedules the H.323 protocol stack to open a media logical channel interface, and establishes a media transmission channel; and the remote presentation endpoint schedules a media transmitting and receiving processing interface of the H.323 protocol stack to transfer media streams via the media transmission channel.

After the above remote presentation endpoint schedules the media transmitting and receiving processing interface of the H.323 protocol stack to transfer media streams, when the first state indicates that the call is hanged up, the remote presentation endpoint schedules the third-party protocol stack to release protocol stack resources.

In the embodiment, the above third-party protocol stack includes but is not limited to: a CLUE protocol stack.

Figure 2:
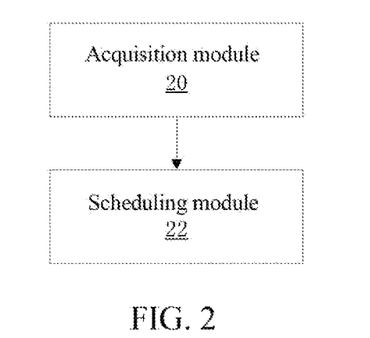
FIG. 2 is one block diagram of a structure of a device for scheduling a protocol stack in a remote presentation system according to the embodiment of the present document.

In the embodiment, a device for scheduling a protocol stack in a remote presentation system is provided, and as shown in FIG. 2, the device includes:

an acquisition module 20, arranged to acquire a first state of an H.323 protocol stack and a second state of a third-party protocol stack, herein, the third-party protocol stack is used for performing interaction and negotiation on new characteristic parameters of the remote presentation system, and the new characteristic parameters are different from contents for performing capability negotiation through the H.323 protocol stack in the remote presentation system; and a scheduling module 22, connected to the acquisition module 20, and arranged to schedule the H.323 protocol stack and/or the third-party protocol stack to execute a corresponding internal processing action according to a preset scheduling rule based on the first state and/or the second state.

Figure 3:
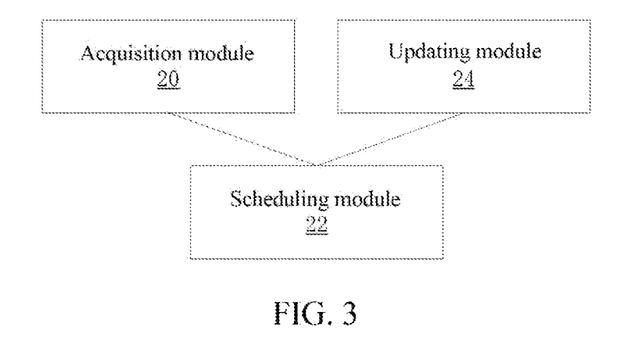
FIG. 3 is another block diagram of a structure of a device for scheduling a protocol stack in a remote presentation system according to the embodiment of the present document.

Alternatively, as shown in FIG. 3, the above device also can include: an updating module 24, connected to the scheduling module 22, and arranged to: when the first state and/or the second state is changed, update the first state and/or the second state; the scheduling module 22 is arranged to schedule the H.323 protocol stack and/or the third-party protocol stack to execute a next action according to the updated first state and the updated second state.

The scheduling module 22 is further arranged to: redetermine a scheduling strategy in the preset scheduling rule according to the updated first state and the updated second state, a previous scheduling processing result and a logical relationship between the first state and the second state; and schedule the H.323 protocol stack and/or the third-party protocol stack to execute the next action according to the redetermined scheduling strategy.

It should be noted that "first" and "second" in the embodiment are only used for differentiating different information or entities, which does not constitute a limitation on the related information or entities. Moreover, each of the above modules related in the embodiment can be implemented through software or hardware, and for the latter, it can be implemented in the following way in one alternative embodiment: the acquisition module 20 is located in a first processor, the scheduling module 22 is located in a second processor, and the updating module 24 is located in a third processor; or, the acquisition module 20, scheduling module 22 and update module 24 are all located in the same processor, but it is not limited to this.

Figure 4:
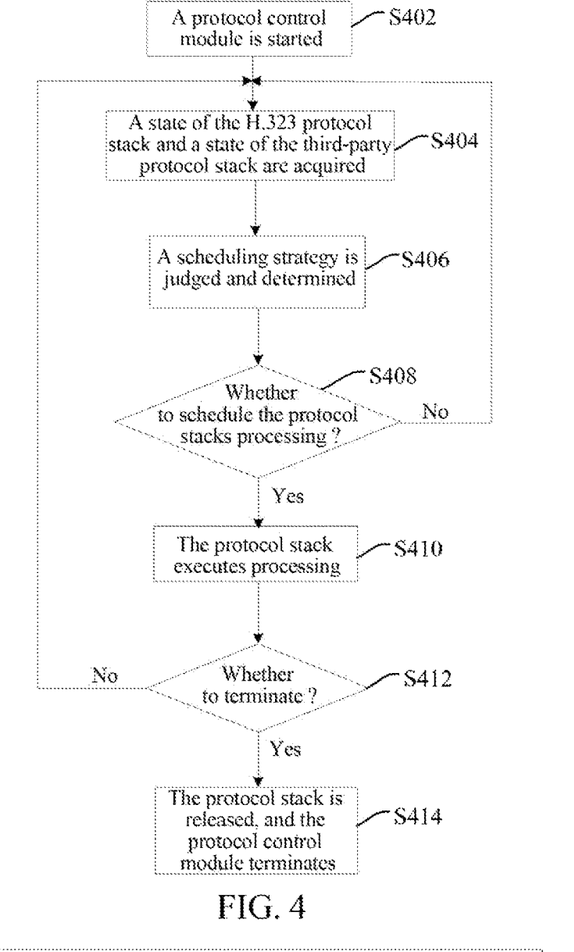
FIG. 4 is a schematic diagram of a collaboration process of multiple protocol stacks according to the preferred embodiment of the present document.

In order to better understand the above embodiment, detailed descriptions will be made in combination with the alternative embodiment below. The main design idea of the following embodiment lies in that, the interaction and negotiation of new characteristic parameters of the remote presentation is implemented through an independent third-party protocol stack, and an H.323 protocol stack and a third-party protocol stack are controlled through a protocol control module. The protocol control module respectively acquires a state of the H.323 protocol stack and a state of the third-party protocol stack, determines a scheduling strategy in combination with the protocol stack states, a previous scheduling processing result and a service logic, and triggers the next action of the protocol stacks. Specifically, as shown in FIG. 4, the following processing steps can be included.

In step S402, a protocol control module is started;

In step S404, a state of the H.323 protocol stack and a state of the third-party protocol stack are acquired;

In step S406, according to the acquired states of the above protocol stacks, a scheduling strategy is judged and determined;

In step S408, it is to judge whether to schedule the protocol stack processing, if yes, step S410 is executed, and if no, it proceeds to step S404;

In step S410, the corresponding protocol stack executes processing;

In step S412, it is to judge whether to terminate, if yes, it proceeds to step S414, and if no, it proceeds to step S404;

In step S414, it is to release the protocol stack, and the protocol control module is terminated.

Figure 5:
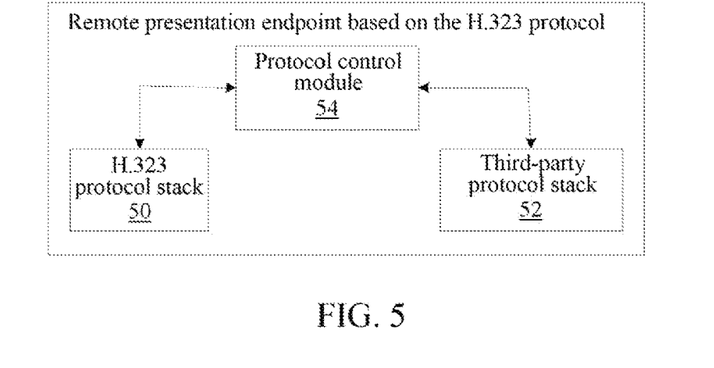
FIG. 5 is a schematic diagram of a structure of a remote presentation endpoint based on the H.323 protocol according to the embodiment of the present document.

As shown in FIG. 5, the remote presentation endpoint based on the H.323 protocol at least includes: an H.323 protocol stack 50, a third-party protocol stack 52 and a protocol control module 54.

Figure 6:
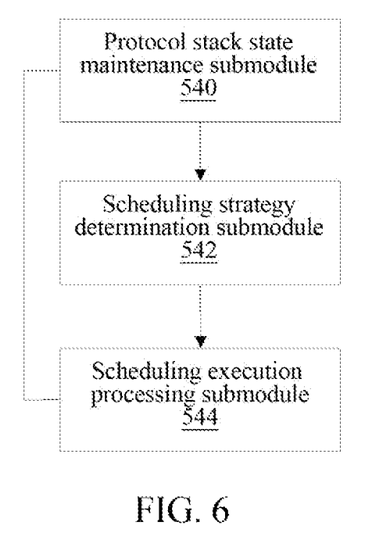
FIG. 6 is a schematic diagram of a submodule of a protocol control module according to the alternative embodiment of the present document.

Herein, as shown in FIG. 6, the protocol control module 54 can be further divided into a protocol stack state maintenance submodule 540, a scheduling strategy determination submodule 542 and a scheduling execution processing submodule 544.

The protocol stack state maintenance submodule 540 updates state information of each protocol stack after the protocol stack completes the processing action; the scheduling strategy determination submodule 542 judges and determines a new scheduling strategy according to a current state of the protocol stack, a previous scheduling processing result and a service logic; the scheduling execution processing submodule 544 schedules a processing action of the protocol stack and acquires a processing result, and each protocol stack completes an internal processing action according to the scheduling of the scheduling execution processing submodule; and the action of scheduling the protocol stack includes at least one of the following: initialization of the protocol stack, a protocol processing interface, and releasing the protocol stack.

Figure 7:
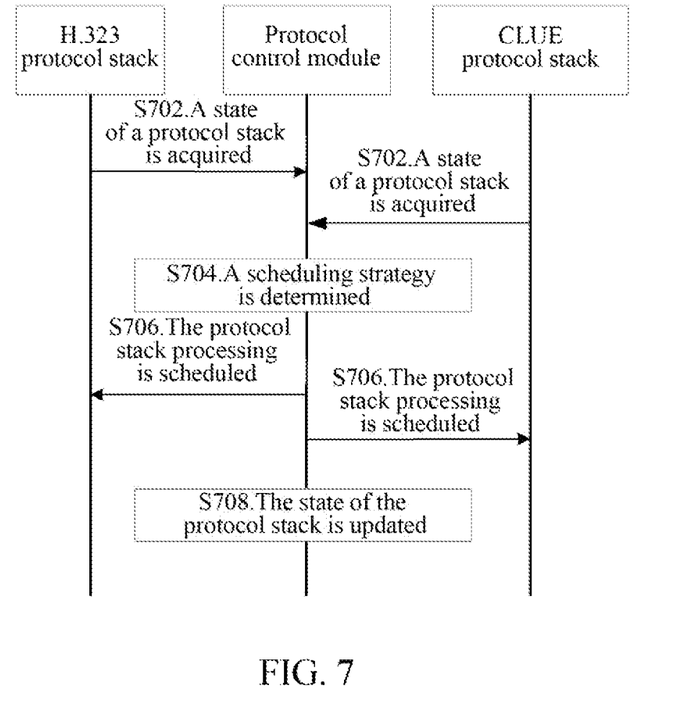
FIG. 7 is a schematic diagram of a collaboration flow of multiple protocol stacks according to the alternative embodiment of the present document.

As shown in FIG. 7, a collaboration process of the protocol control module 54 includes the steps: in step S702, the protocol control module respectively acquires a state of the H.323 protocol stack and a state of the third-party protocol stack; in step S704, the protocol control module judges and determines a new scheduling strategy according to a current protocol stack state, a previous scheduling processing result and a service logic; and in steps S706-S708, the protocol control module schedules a processing action of the protocol stacks and acquires a processing result, and updates the states of the protocol stacks.

The descriptions will be made through an example of the third-party protocol stack as a CLUE protocol stack below. The H.323 protocol stack and the CLUE protocol stack collaboratively work; the remote presentation endpoint (a terminal or an MCU) based on the H.323 protocol contains an H.323 protocol stack, a CLUE protocol stack and a protocol control module; herein, the H.323 protocol stack is a protocol stack module implemented according to the standards; the CLUE protocol stack is used for implementing the description and interaction and negotiation of the new characteristic parameters of the remote presentation; the protocol control module controls the H.323 protocol stack and CLUE protocol stack, and a signaling interaction of the remote presentation is implemented through collaborative work.

Figure 8:
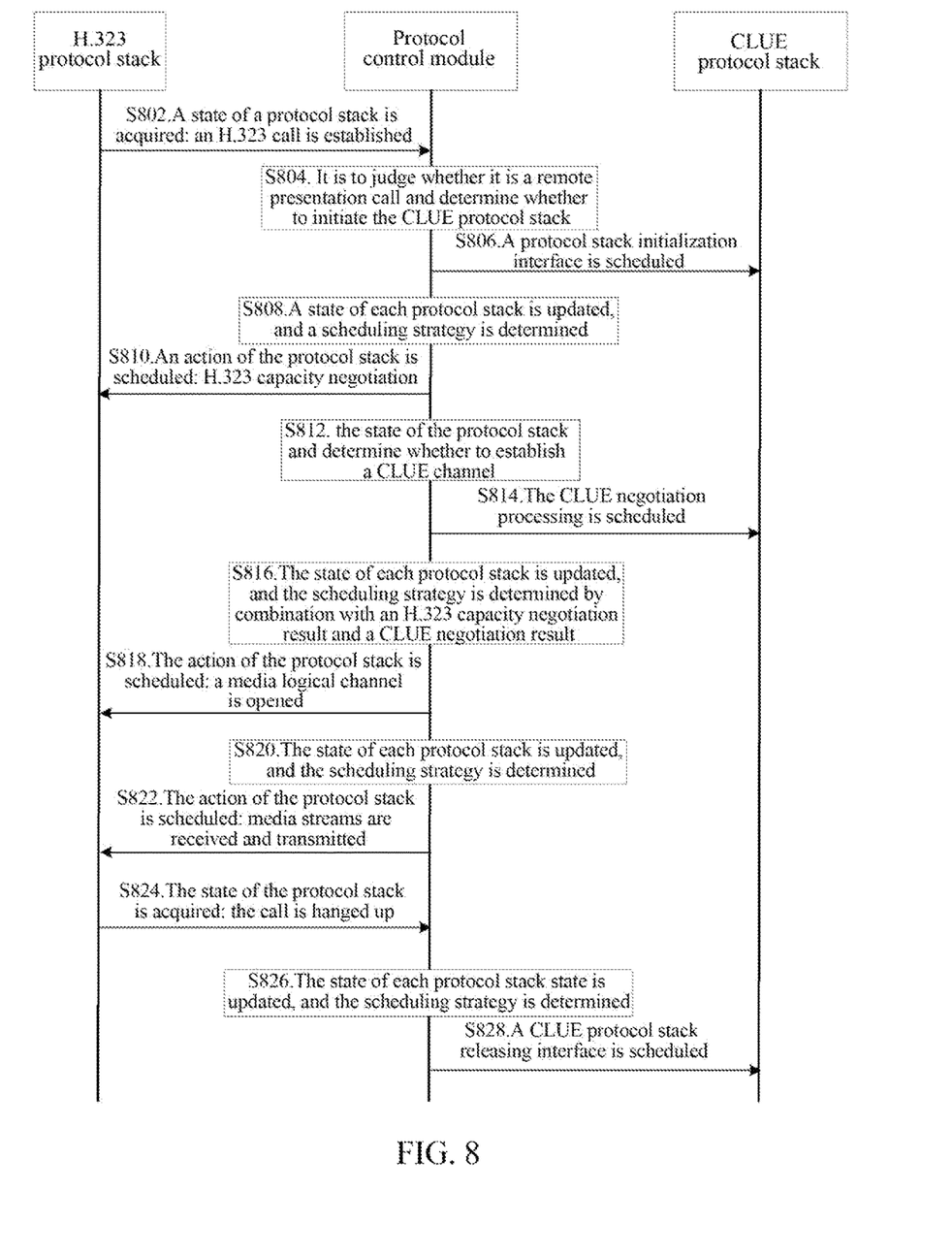
FIG. 8 is a schematic diagram of a collaboration flow of the H.323 protocol stack and the CLUE protocol stack according to the alternative embodiment of the present document.

As shown in FIG. 8, a scheduling flow of the protocol control module includes the following processing steps.

In step S802, after the protocol control module is started to operate, a protocol stack state maintenance submodule acquires a state of the H.323 protocol stack, for example, the acquired state is an H.323 call establishment;

In step S804, a scheduling strategy determination submodule judges whether the current call is remote presentation communication and supports a CLUE protocol, for example, it is judged through a CLUE identifier supported by the endpoint in the call signaling and remote presentation characteristic extension information and so on;

In step S806, if it is the remote presentation communication supporting the CLUE, a scheduling execution processing submodule is required to schedule a CLUE protocol stack initialization interface to perform processing. If it is traditional non-remote presentation communication, processing is performed according to an original H.323 protocol flow;

In step S808, after the scheduling processing is completed, the protocol stack state maintenance submodule is required to update the current states of the H.323 protocol stack and CLUE protocol stack; and the scheduling strategy determination submodule judges and determines the next step of scheduling strategy;

In step S810, the scheduling execution processing submodule schedules an H.323 protocol stack capacity negotiation processing flow;

In step S812, after the scheduling processing is completed, the protocol stack state maintenance submodule is required to update the current states of the H.323 protocol stack and CLUE protocol stack; and the scheduling strategy determination submodule judges and determines whether to establish a CLUE channel or uses a control channel established by the H.323 protocol stack to perform negotiation of new characteristics of the remote presentation;

In step S814, the scheduling execution processing submodule schedules a negotiation processing action of the CLUE protocol stack, and completes a CLUE negotiation process in combination with the above H.323 capacity negotiation result;

In step S816, after the scheduling processing is completed, the protocol stack state maintenance submodule is required to update the current states of the H.323 protocol stack and CLUE protocol stack; and the scheduling strategy determination submodule determines the next processing strategy according to the protocol stack states and the H.323 capacity negotiation result and CLUE negotiation result;

In step S818, the scheduling execution processing submodule schedules the H.323 to start processing of media logical channels, and open a media logical channel conforming to the H.323 capacity negotiation result and CLUE negotiation result;

In step S820, after the scheduling processing is completed, the protocol stack state maintenance submodule is required to update the current states of the H.323 protocol stack and CLUE protocol stack; and the scheduling strategy determination submodule determines the next step of scheduling processing according to the protocol stack states and the opening situation of the media logical channel;

In step S822, the scheduling execution processing submodule schedules a media transmitting and receiving processing interface of the H.323 protocol stack to transfer media streams;

In steps S824-S826, if acquiring a state that the H.323 protocol stack hangs up the call, the protocol stack state maintenance submodule updates the protocol stack states; and the scheduling strategy determination submodule judges whether it is required to release the CLUE protocol stack according to the protocol stack states, and determines the next step of scheduling processing policy;

In step S828, the scheduling execution processing submodule schedules the CLUE protocol stack to release the interface, and completes the release of CLUE protocol stack resources.

It should be noted that the remote presentation endpoint in the embodiment can be a remote presentation terminal or a remote presentation Multi Control Unit (MCU); and in the communication of the remote presentation system communication, it can be that one party or two parties of the communication are a remote presentation endpoint having the above functions or characteristics.

In another embodiment, software is also provided, and the software is used for executing the above embodiment and the technical scheme described in the alternative embodiment.

In another embodiment, a storage medium is also provided, the above software is stored in the storage medium, and the storage medium includes but is not limited to: an optical disk, a floppy disk, a hard disk and an erasable memory, etc.

It will be apparent to those skilled in the art that they should understand that the modules or steps of the present document mentioned above can be implemented through a universal computing device, and they can be concentrated on a single computing device or distributed in a network consisting of multiple computing devices. Alternatively, the modules or steps can be implemented through program codes which can be executed by the computing device, thus, they can be stored in a storage device to be executed by the computing device, and in some cases, the illustrated or described steps can be executed in a order different from here, or they can be made into multiple integrated circuit modules respectively, or multiple modules or steps of them can be made into a single integrated circuit module to be implemented. Therefore, the present document is not limited to any combination of hardware and software in a specific form.

The above description is only the alternative embodiments of the present document, which is not used to limit the present document. The present document can have various modifications and changes for those skilled in the art. All the modifications, equivalent substitutions, and improvements, etc. made within the spirit and principle of the present document shall fall into the protection scope of the present document.

INDUSTRIAL APPLICABILITY

Based on the above technical scheme provided in the embodiment of the present document, with the technical means of the remote presentation endpoint performing scheduling on the two types of protocol stacks according to the acquired state of the H.323 protocol stack and the acquired state of the third-party protocol stack, the technical problems that there has been no solution of introducing the third-party protocol stack (such as a CLUE protocol stack) in an H.323 system to implement the interaction and negotiation of the new characteristic parameters yet in the related art are solved, thereby implementing coordinated scheduling of multiple protocol stacks in the remote presentation system.

What is claimed is:

1. A method for scheduling a protocol stack in a remote presentation system, comprising:
 a remote presentation endpoint acquiring a first state of an H.323 protocol stack and a second state of a third-party protocol stack, wherein, the third-party protocol stack is used for performing interaction and negotiation on new characteristic parameters of the remote presentation system, and the new characteristic parameters are different from contents for performing capability negotiation through the H.323 protocol stack in the remote presentation system; and
 the remote presentation endpoint scheduling the H.323 protocol stack and/or the third-party protocol stack to execute a corresponding processing action according to a preset scheduling rule based on the first state and/or the second state;

wherein, the remote presentation endpoint scheduling the H.323 protocol stack and/or the third-party protocol stack to execute a corresponding processing action according to a preset scheduling rule based on the first state and/or the second state comprises:
when the first state indicates that a current call is remote presentation communication and supports a third-party protocol corresponding to the third-party protocol stack, the remote presentation endpoint starting the third-party protocol stack;
wherein, after the remote presentation endpoint starting the third-party protocol stack, the method further comprises:
the remote presentation endpoint updating the first state and the second state; and the remote presentation endpoint scheduling the H.323 protocol stack to perform capability negotiation and determining a communication channel required to be used for executing the interaction and negotiation of the new characteristic parameters according to an updated first state and an updated second state updated.

2. The method according to claim 1, wherein, the remote presentation endpoint scheduling the H.323 protocol stack and/or the third-party protocol stack to execute a corresponding processing action according to a preset scheduling rule based on the first state and/or the second state comprises:
when the first state and/or the second state is changed, the remote presentation endpoint updating the first state and/or the second state, and scheduling the H.323 protocol stack and/or the third-party protocol stack to execute a next action according to an updated first state and an updated second state.

3. The method according to claim 2, wherein, scheduling the H.323 protocol stack and/or the third-party protocol stack to execute a next action according to a preset scheduling rule comprises:
redetermining a scheduling strategy in the preset scheduling rule according to the updated first state and/or the updated second state, a previous scheduling processing result and a logical relationship between the first state and the second state; and
scheduling the H.323 protocol stack and/or the third-party protocol stack to execute the next action according to a redetermined scheduling strategy.

4. The method according to claim 1, wherein, the remote presentation endpoint scheduling the H.323 protocol stack and/or the third-party protocol stack to execute a corresponding processing action according to a preset scheduling rule based on the first state and/or the second state comprises at least one of the following:
performing initialization processing on the H.323 protocol stack and/or the third-party protocol stack, scheduling a protocol processing interface of the H.323 protocol stack and/or the third-party protocol stack, and releasing the H.323 protocol stack and/or the third-party protocol stack.

5. The method according to claim 1, wherein, after determining a communication channel required to be used for executing the interaction and negotiation of the new characteristic parameters, the method further comprises
the remote presentation endpoint scheduling a processing interface of the third-party protocol stack to perform interaction and negotiation of the new characteristic parameters;
the remote presentation endpoint scheduling the H.323 protocol stack to open a media logical channel interface, and establishing a media transmission channel according to a capability negotiation result of the H.323 protocol stack and a negotiation result of the new characteristic parameters; and
the remote presentation endpoint scheduling a media transmitting and receiving processing interface of the H.323 protocol stack to transfer media streams via the media transmission channel.

6. The method according to claim 5, wherein, after the remote presentation endpoint schedules a media transmitting and receiving processing interface of the H.323 protocol stack to transfer media streams, the method further comprises:
when the first state indicates that the call is hanged up, the remote presentation endpoint scheduling the third-party protocol stack to release protocol stack resources.

7. A device for scheduling a protocol stack in a remote presentation system, comprising:
an acquisition module, arranged to acquire a first state of an H.323 protocol stack and a second state of a third-party protocol stack, wherein, the third-party protocol stack is used for performing interaction and negotiation on new characteristic parameters of the remote presentation system, and the new characteristic parameters are different from contents for performing capability negotiation through the H.323 protocol stack in the remote presentation system; and
a scheduling module, arranged to schedule the H.323 protocol stack and/or the third-party protocol stack to execute a corresponding processing action according to a preset scheduling rule based on the first state and/or the second state;
an updating module, arranged to: when the first state and/or the second state is changed, update the first state and/or the second state;
wherein, the scheduling module is arranged to schedule the H.323 protocol stack and/or the third-party protocol stack to execute a next action according to an updated first state and an updated second state;
wherein, the scheduling module is further arranged to: redetermine a scheduling strategy in the preset scheduling rule according to the updated first state and the updated second state, a previous scheduling processing result and a logical relationship between the first state and the second state; and schedule the H.323 protocol stack and/or the third-party protocol stack to execute the next action according to a redetermined scheduling strategy.

* * * * *